Feb. 15, 1944.  E. W. AUSTIN  2,341,853
TRACTOR ATTACHMENT
Filed June 14, 1941   3 Sheets-Sheet 1
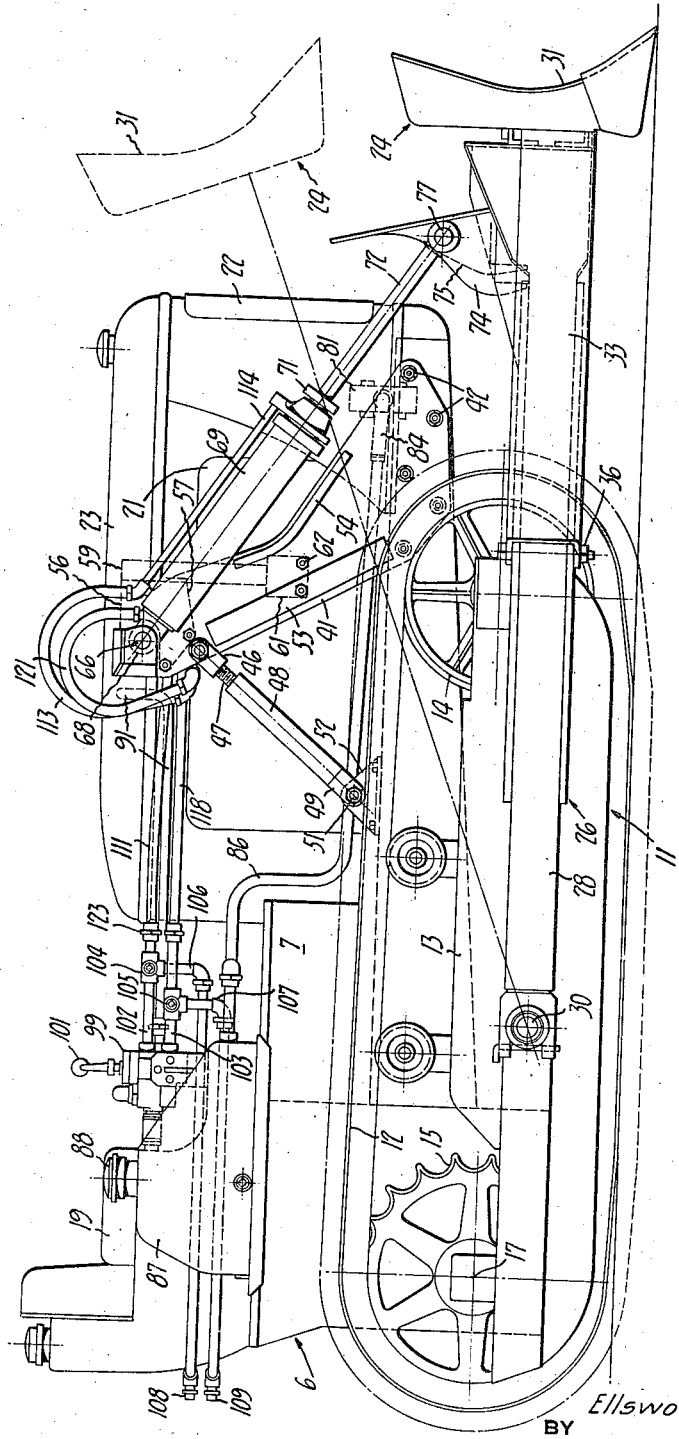
INVENTOR
*Ellsworth W. Austin*
BY
*Marcus Lothrop*

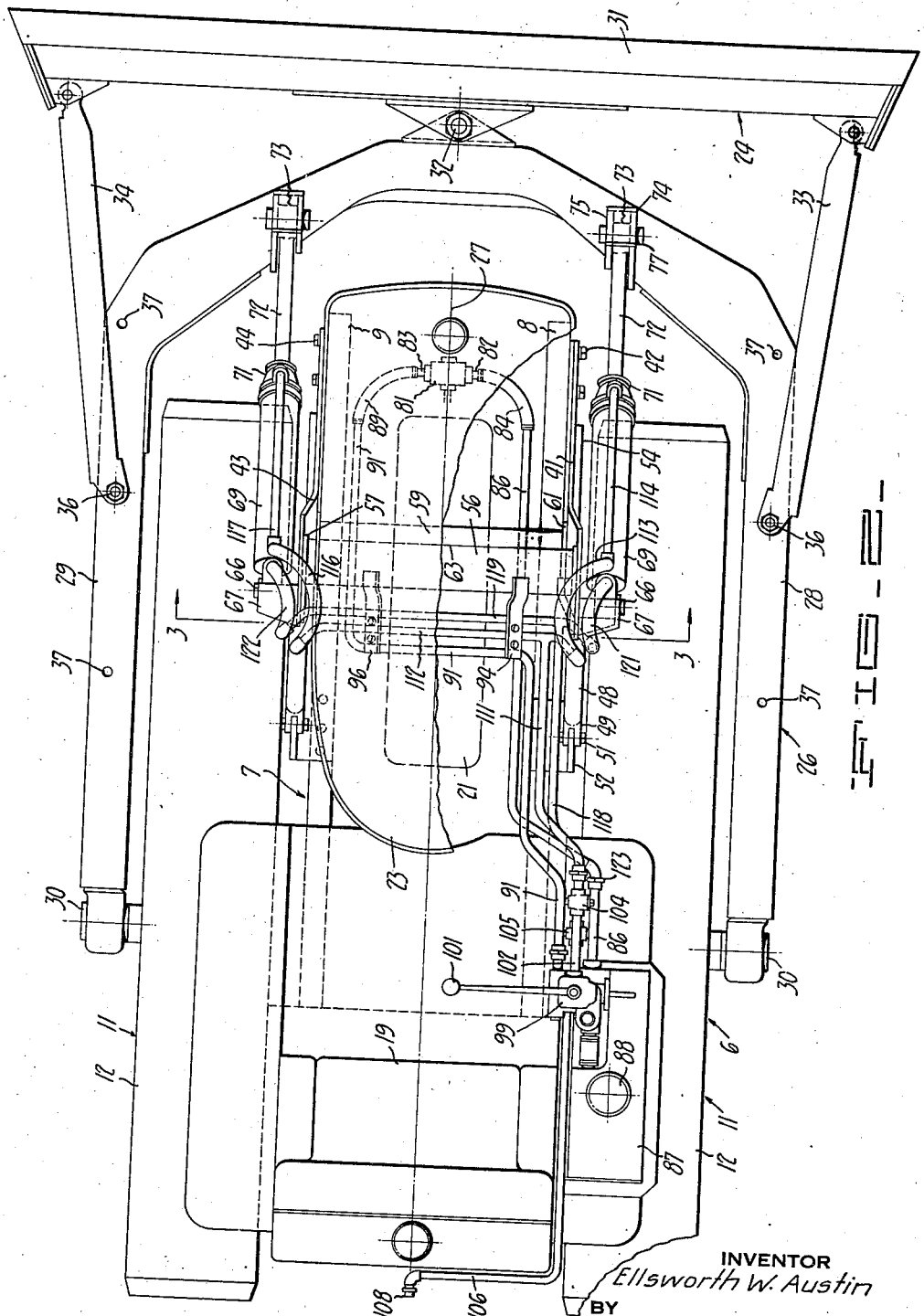

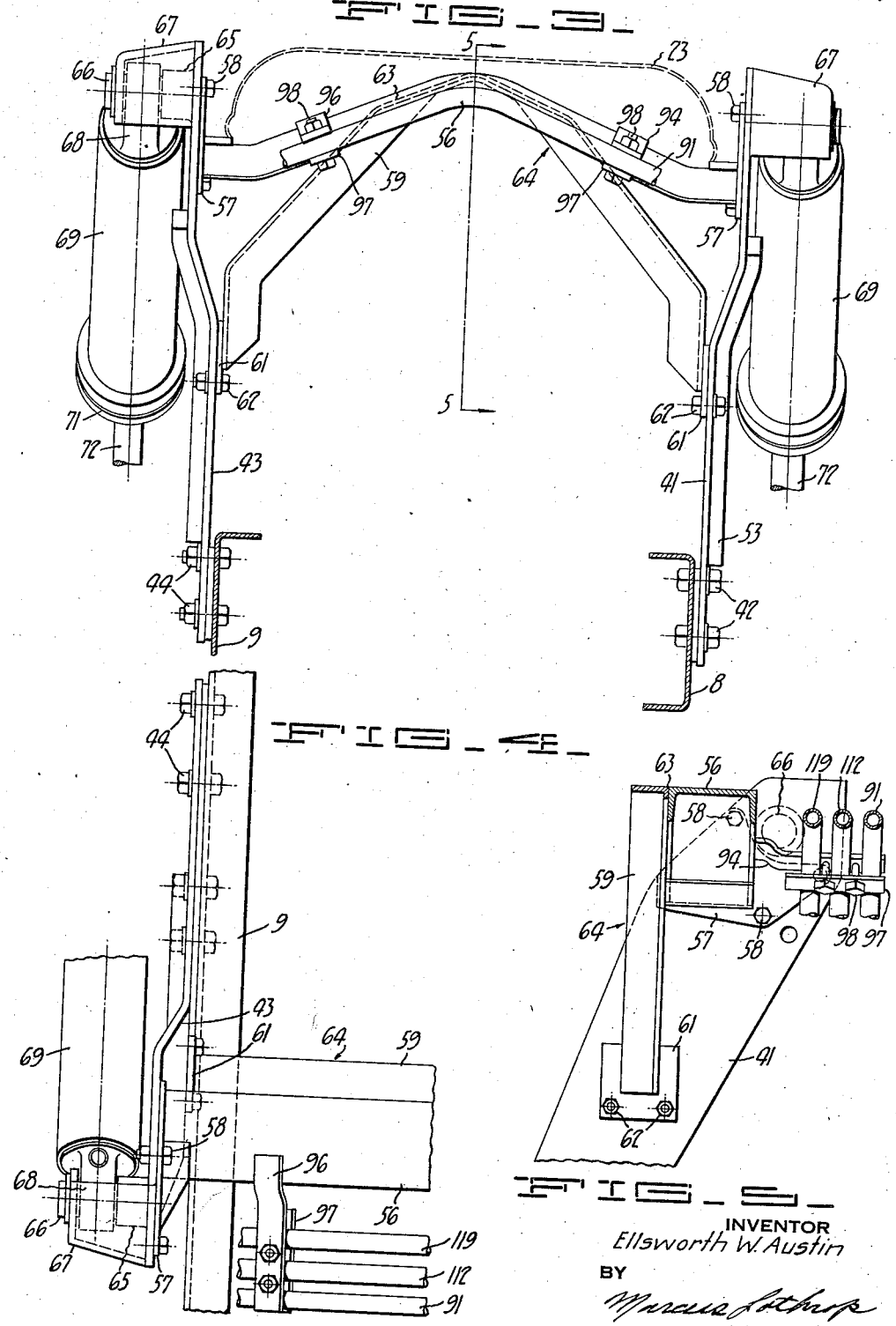

Patented Feb. 15, 1944

2,341,853

UNITED STATES PATENT OFFICE 2,341,853

TRACTOR ATTACHMENT

Ellsworth W. Austin, Cedar Rapids, Iowa, assignor to La Plant-Choate Mfg. Co., Inc., Cedar Rapids, Iowa, a corporation of Delaware Application June 14, 1941, Serial No. 398,130

8 Claims. (Cl. 37—144)

My invention relates to means for application to a tractor so that implements designed to be propelled by the tractor can be mounted and operated.

It is customary for a tractor to be manufactured as a finished product and subsequently for any one of various different types of implements to be mounted on and attached to it. For example, a commonly used tool is a bulldozer or trailbuilder for advancing earth in front of a track laying tractor, the bulldozer being arranged to swing in a vertical arc in front of the tractor radiator. The weight of the bulldozer or trailbuilder is thus added in advance of the tractor radiator, and since the forward portion of the tractor projects beyond the supporting tracks, the added implement tends to unbalance the tractor, to make it nose-heavy. The fore and aft stability of the tractor depends largely on the location of weight with respect to the track.

There is also a matter of transverse stability. In one arrangement, the bulldozer mountings are fastened directly on the track laying track frames themselves, but since these bob up and down independently on uneven ground, some sort of cross equalization is necessary in order to maintain the semblance of a smooth path for the bulldozer. Cross equalization introduces either a substantial time lag or relatively complicated mechanism.

While some tools do not, a trailbulder or bulldozer requires a relatively large arc of travel; that is, the earth-engaging blade must be moved to a relatively high point with respect to the tractor. This usually requires relatively large supporting frames which tend to obstruct the driver's vision, or requires leverages and linkages to transmit and multiply the travel of the motive power which increases the cost and requires a large number of stressed parts.

As other factors, the mechanism must be mounted on a tractor which already has been well designed for accessibility and it is often necessary to ship the attachment from the factory and erect it in the field.

Also, a considerable time lag intervenes between manipulation of the controller and response of the tool because of elastic elongation of metal transmission parts in lever or cable arrangements or because of elastic expansion of pipes and hoses in hydraulic arrangements. This is added to by the necessary working clearances in a train of mechanical links, which aggravates into cumulative lost motion as operating wear increases.

It is therefore an object of my invention to reduce the time lag in response to operation.

Another object of my invention is to provide a tractor attachment in which the fore and aft balance of the tractor when the device is attached is disturbed but little.

Another object of my invention is to provide a tractor attachment in which there is no necessity for cross equalization to provide a smooth path of travel for the bulldozer blades.

Another object of my invention is to provide a tractor attachment in which the force is directly transmitted, thereby obviating intermediate links and stressed structure.

Another object of my invention is to provide a tractor attachment in which the tractor operator's vision is not substantially obstructed.

Another object of my invention is to provide a tractor attachment which can readily be assembled in the field.

A further object of my invention is to provide a tractor attachment in which the accessibility of the tractor is not substantially impaired.

An additional object of my invention is to provide a generally improved tractor attachment.

The foregoing and other objects are attained in the embodiment of the invention illustrated in the drawings, in which Fig. 1 is a side elevation of my tractor attachment mounted on a tractor and ready for operation.

Fig. 2 is a plan of the tractor attachment as shown in Fig. 1.

Fig. 3 is a cross-section, the plane of which is indicated by the line 3—3 of Fig. 2.

Fig. 4 is a fragmentary plan of the lefthand portion of the structure shown in Fig. 3.

Fig. 5 is a cross section, the plane of which is indicated by the line 5—5 of Fig. 3.

In its preferred form the tractor attachment of my invention is designed to be utilized with a tractor which has a frame, an engine on the frame, a hood over the engine and an implement mounted to swing on the tractor. The attachment comprises a pair of brackets, each of which is fastened at its bottom to the frame at one side of the engine. The two brackets adjacent their top are connected by a cross brace which is removable and passes between the engine and the hood. Each bracket is also provided with a strut which is variable in length and extends between the top of the bracket and the frame. Also to the top of each bracket is pivoted a hydraulically expansible chamber which extends to the implement. Conduits for supplying the hydraulic chambers extend thereto and are supported between the engine and the hood on the cross brace. A standard control valve and hydraulic supply is utilized to serve the expansible members.

Although the tractor attachment can be applied to tractors of various different types, it is usually mounted in connection with a track layer type, generally designated 6. This machine includes a main frame, generally designated 7, having side rails 8 and 9, respectively, disposed centrally between a pair of track laying elements, generally designated 11, each of which includes a track 12 encompassing a track truck 13 on which are rotatably mounted a front idler 14 and a drive sprocket 15, arranged with the track 12 trained around the idler and the sprocket. The sprocket 15 is mounted to revolve in the main frame 7 about an axis 17, which is also the axis of oscillation in vertical planes of the track elements 11. These latter are also connected with the central frame 7 by a transverse equalizer spring (not shown) of standard construction which permits the individual track elements 11 to rise and fall in their swinging movement, but moves the main frame 7 substantially half the amount of track element deflection. The main frame is therefore considerably more stable than either of the track elements.

The main frame provides not only an operator's station 19, but also supports an engine illustrated by the block outline 21. In some designs, especially in smaller models, the engine 21 itself forms the forward part of the main frame, and separate side rails 8 and 9 are eliminated. The designation "main frame" herein is intended to refer to both designs. In the present arrangement the engine radiator 22 is disposed at the forward end of the frame and extends well in advance of the forward end of the track elements 11. A removable hood 23 overlies the radiator 22 and the engine 21 affording a stiff support for the radiator and protection for the engine. The hood is easy to remove so that the engine can be worked upon handily, and together with the radiator and associated parts encloses or defines an engine compartment.

Various different types of rising and falling or swinging implements can be secured to the tractor, and for illustration I have shown a common instance in which a trailbuilder 24 (of the bulldozer type) is provided. This implement includes a U frame 26 symmetrical in a horizontal plane about the center axis 27 of the assembly and has each one of a pair of side beams 28 and 29 extending around its adjacent track element 11 to a pivot connection 30 on the associated truck 13. The connections 30 on opposite sides of the vehicle are substantially identical and coaxial so that the frame 26 can swing in a vertical arc with respect to the track elements 11 and to the main frame 7 with the earth tool 24 occupying the dotted line position (Fig. 1) when raised to its limit.

With the present type of implement, the blade 31 can be oscillated about a vertical axis 32 intersecting the axis 27 by moving push beams 33 and 34 so that their securing pins 36 occupy selected ones of spaced apertures 37 in the side push beams 28. With this trailbuilder arrangement as well as with a bulldozer in which the blade 31 is solid with the U frame 26, the center of mass of the implement is fairly far forward with respect to the tractor and the addition of this weight on the tractor tends to make the tractor nose-heavy and on uneven ground to pitch or oscillate in a vertical plane.

In order to provide actuating mechanism for the trailbuilder or bulldozer, or other implement, and to keep the mass as far rearwardly as is consistent with simplicity, I provide a pair of devices which for the most part are identical except for symmetry and hence but one need be described in detail. On the side rails, for example on the side rail 8, I mount a bracket 41 which is secured by removable bolts 42 passing through holes in the lower end of the bracket and through corresponding holes in the side frame member 8. Similarly, on the other side of the center axis 27, I provide on the side rail 9 a second bracket 43 secured by bolts 44.

The bracket 41 is inclined rearwardly and is fabricated to constitute one leg of an A frame. Thus, adjacent its upper end the bracket is pierced to accommodate the pin of a pivoted clevis 46 having a threaded extension 47 adapted to interengage with a threaded sleeve 48, itself terminating in a bifurcation 49, connected by a pin 51 to a bracket 52 removably secured to the side rail 8. The threaded portion 47 and the sleeve 48 together constitute a strut making up the other part of the A frame and variable in length so that minor irregularities in the positioning of the bracket 52 and of the holes of the fastening 42, and also in the fabrication of the bracket 41, and of the strut 48 itself, can be compensated for. The adjustment in length can readily be made at any time, for example, by removing the pin 51, swinging the strut slightly about the axis of the other pin and then revolving the sleeve 48 the desired amount to change the spacing of the two end pins. When this dimension is as desired, the strut is swung back adjacent its original position and the pin 51 is again inserted through the pierced bifurcation 49 and bracket 51. In this way, adjustment is readily effectuated. Further, in order to stiffen the A frame the plate 41 is provided with welded on reinforcing bars 53 and 54. These follow the peripheral contour of the plate where it is otherwise substantially unsupported and also stiffen it to compensate for an intermediate offset, as shown in Fig. 4.

In accordance with my invention, I preferably tie the brackets 41 and 43 of the A frames together transversely to provide an exceedingly stiff structure. An arched channel 56 extends transversely of the tractor and is passed through a convenient portion of the engine compartment preferably being disposed between the top of the engine 21 and beneath the hood 23 so that the hood can readily be removed for general access to the engine without disturbing the channel 56. Preferably adjacent each end, the channel is enlarged by merger with a pad 57. Bolt or stud fasteners 58 are passed through the pads 57 and the corresponding portion of the top of the brackets 41 and 43.

To impart additional stiffness, the channel 56 is augmented with a formed angle 59 following the same general contour as the channel 56, but being even more deeply arched and extending downwardly to pads 61 overlying an intermediate portion of the brackets 41 and 43 to which it is secured by removable studs or bolts 62. Preferably, the angle arch 59 and the channel arch 57 are welded together adjacent their central portions 63 to form a single unit brace, generally designated 64. Thus, in installation, the brace 64 is positioned over the engine after the lower ends of the brackets 41 and 43 have been secured, and is then bolted to the upper ends of the brackets. Removal of either one of the brackets 41 or 43, however, can be accomplished without disturbing the other plate and the brace 64, thus rendering accessible one or the other side of the engine.

In accordance with my invention, I afford means for swinging the implement 24. This mechanism is preferably in the nature of hydraulically extensible chambers which are identical so that but one need be described in detail. The top of each of the plates 41 or 43 is reinforced by a boss 65 in which a pivot pin 66 is received. The pin is further supported by a bracket 67 welded to the plate and extending to encompass the outboard end of the pin. The bracket 67 is in the nature of a shroud protecting the bearing for the pin and likewise protecting the upper end of the extensible mechanism.

Journalled on the pin is an eye 68 constituting the pivot bearing in the head of a cylinder 69 of relatively long stroke and within which is disposed a piston (not shown). From the piston through a packing mechanism 71 extends a piston rod 72 terminating in a lower eye 73. A pair of ears 74 and 75 are welded to and stand up from the U frame 26 and a pivot pin 77 fastens the eye 73 between the ears. The ears are preferably extended and bridged not only for added strength but also to form a guard for the rod 72 against material sweeping over the top of the blade 31.

When the piston rod 72 retracts within and projects from the cyilnder 69, the implement is raised and lowered directly without lost motion and with but little elasticity. The general mass of the mounting bracket 41, the strut 48, the brace 64 and the cylinder and piston rod assembly 69 and 72 is disposed well toward the rear of the tractor and well behind the front end of the track element 11. Thus, this added weight is disposed at a favorable location so that the tractor balance is not adversely disturbed and no undue pitching fore and aft is introduced into the completed assembly. Particularly when the implement 24 is lifted from the ground, the parts travel toward the rear in every instance so that as the mass rises it also shifts rearwardly to a more favorable location.

Also, the location and mounting of the cylinders, their brackets, struts and brace are such that they do not interfere with access to part or all of the engine and do not interfere with removal of the hood. Furthermore, these parts are relatively close to the standard tractor mechanism and are not any substantial obstruction to the vision of an operator sitting at the operator's station 19 and watching the performance of the implement 24.

In order to serve the hydraulically extensible chambers 69, I preferably mount at the front of the engine 21 and drive by the engine crankshaft a liquid pump 81. This is any desired type of positive displacement pump and is provided with an inlet 82 and an outlet 83. The inlet receives oil through a rubber hose 84 connected to a pipe 86 extending to a tank 87 mounted on the tractor main frame 7 and provided with a filler cap 88 through which the supply can from time to time be replenished and from which air released from the fluid can escape.

The outlet 83 of the pump discharges through a rubber hose 89 into a pipe 91 extending along the opposite side of the engine 21 from the pipe 86 and generally following the contour of the bracket 43. The pipe is then turned and is supported by a pair of brackets 94 and 96 respectively, welded to the brace 64. Clip bars 97 and removable fasteners 98 facilitating the installation and removal of the pipe. From the bracket 96 the pipe 91 extends to a control valve body 99 disposed on the tank 87 and having an operating handle 101 conveniently located with regard to the operator's station 19. The valve 99 is entirely standard and consequently is not described in detail. It has, however, means for providing for return circulation of oil to the tank 87, for regulating the maximum pressure of the liquid expelled by the pump and for discharging or receiving liquid alternately from two control ducts 102 and 103, respectively. The duct 102 is the lifting duct, while the duct 103 is the lowering duct.

Both of the ducts 102 and 103 shortly in advance of the valve 99 are provided with three-way cocks 104 and 105 affording communication with associated pipes 106 and 107 extending to the central rear portion of the tractor so that if the cocks 104 and 105 are appropriately manipulated the remaining part of the structure can be cut off and the valve 99 can be utilized to control whatever mechanism is connected to the outlets 108 and 109 at the end of the pipes 106 and 107. In the present operation, the cocks 104 and 105 are turned so that the control ducts 102 and 103 are effective.

From the cock 104 a pipe 111 extends to a transverse pipe 112 lying alongside the pipe 91 and also held by the brackets 94 and 96. One end of the pipe 112 is connected by a hose 113 to a conduit 114 secured to the cylinder 69 and opening communication thereinto at the lower end below the piston. The other end of the cross-pipe 112 is connected by a rubber hose 116 to a conduit 117 extending into the base of its cylinder beneath the piston therein. Thus, when the pipe 102 is supplied with pressure fluid, the fluid flows through the connecting piping and beneath the pistons within the cylinders so that the tendency is to raise the implement 24.

From the cock 105 a pipe 118 runs forwardly and joins a cross-pipe 119 mounted on the brackets 94 and 96, and like pipes 112 and 91 extending transversely of the machine through the engine compartment preferably between the engine and the hood. One end of the cross-pipe 119 is connected through a rubber hose 121 to the upper end of the cylinder 69 above the piston therein, while the other end of the pipe 119 is connected through a rubber hose 122 to the upper end of the opposite cylinder 69 above the piston therein. Thus, when fluid under pressure is supplied through the pipe 103, it follows through the connections and presses against the upper faces of the pistons within the cylinder, thus tending to lower the implement 24. Since the valve 99 is appropriately arranged, its operation by the handle 101 simultaneously actuates both of the extensible mechanisms to raise or to lower the implement, or to hold the implement in place or to permit other operations. The pipes and hoses being relatively short, reduce the elasticity of the hydraulic system, and contribute to lessening the time lag in responsiveness.

Preferably, the pipes 111, 118 and 91 have pipe unions such as 123 at suitable locations so that these pipes which clip to the brace 64 can be pre-assembled with the brace and can then be put into position as a unit with the brace and finally connected. If, therefore, it becomes necessary to have entirely free access to the top of the engine 21, it is necessary only to break the connections of the rubber hoses 121 and 113 on the one side and 122 and 116 on the other side, and to disconnect the hose 89 from the pipe 91 and release the three unions for the pipes 91, 111 and 118. When the fastenings 58 and 62 and the hood 23 have been removed the brace 64 can be lifted out and carries with it substantially the entire center section of the applied mechanism. Furthermore, this separate central section facilitates a separate bench sub-assembly at the factory and permits shipping the tractor attachment in a knocked down condition.

When the center assembly has been removed, either of the side brackets 41 or 43 can be removed by withdrawal of the fastenings 42 and disconnection of the strut 48 so that in a very short time the entire assembly can either be removed from the tractor upon which it has been installed for repair or use elsewhere, or if the reverse process is utilized, the entire mechanism can quickly be assembled on the tractor. Since the side elements themselves are substantially flat, they likewise form a good knocked down shipping unit.

I claim:

1. A tractor attachment for a tractor having a frame, an engine in said frame and a hood over said engine, said attachment comprising an implement mounted on said tractor for swinging movement, brackets upstanding from said frame to a level substantially as high as the top of said engine, a transverse brace detachably secured to said brackets and passing over the top of said engine and beneath said hood, and expansible chamber actuating devices secured to and extending between said brackets and said implement.

2. A tractor attachment for a tractor having a frame, an engine in said frame and a hood over said engine, said attachment comprising an implement mounted on said tractor for swinging movement, brackets upstanding from said frame, a transverse brace removably joining said brackets and passing between said engine and said hood, hydraulic cylinders secured to said brackets and to said implement for swinging said implement, conduits detachably connected to said cylinders, and means for supporting said conduits on said brace whereby said brace and said conduits can be removed as a unit from said brackets and said cylinders.

3. A tractor attachment for a tractor having a frame, an engine in said frame, and an implement mounted for swinging movement, said attachment comprising a bracket secured to and upstanding from said frame at one side of said engine, an implement swinging device mounted on said bracket, a second bracket secured to and upstanding from said frame at the other side of said engine, a second implement swinging device mounted on said second bracket, and a brace extending transversely of said tractor and detachably secured to said brackets adjacent the mounting thereon of said implement swinging devices.

4. A tractor attachment for a tractor having a frame, an engine in said frame, a hood over said engine, and an implement mounted for swinging movement, said attachment comprising a bracket secured to said frame at one side of said engine, a hydraulic implement swinging device mounted on said bracket, a second bracket secured to said frame at the other side of said engine, a second hydraulic implement swinging device mounted on said second bracket, a brace secured to said said second bracket, a brace secured to said brackets and passing between said engine and said hood, conduits for serving said hydraulic devices passing between said engine and said hood, and means for supporting said conduits on said brace.

5. A tractor attachment for a tractor having a frame, and an implement mounted for swinging movement, said attachment comprising a bracket upstanding from said frame, means for securing the bottom of said bracket to said frame, an implement swinging device secured to said implement, means for mounting said device at the top of said bracket, and a strut of variable length secured to the top of said bracket and to said frame.

6. A tractor attachment for a tractor having a frame, and an implement mounted for swinging movement, said attachment comprising a pair of brackets upstanding from said frame, means for securing the bottom of said respective brackets to said frame, a pair of implement swinging devices secured to said implement, means for connecting each of said devices at the top of a respective one of said brackets, struts of variable length secured to the top of said respective brackets and to said frame, and a brace secured to both of said brackets.

7. A tractor attachment for a tractor having a frame and an implement mounted for movement relative to said tractor, said attachment comprising a pair of brackets upstanding from and secured to said frame, a pair of implement moving devices attached to said implement and to said brackets, and a brace detachably secured to said brackets independent of the attachment of said moving devices thereto and extending over said frame.

8. A tractor attachment for a tractor having a frame and an implement mounted for movement relative to said tractor, said attachment comprising a pair of brackets upstanding from and secured to said frame, a pair of implement moving devices attached to said implement and to said brackets on the outer sides thereof, and a brace detachably secured to said brackets on the facing sides thereof and extending over said frame.

ELLSWORTH W. AUSTIN.